(12) United States Patent
Escude et al.

(10) Patent No.: US 6,403,031 B1
(45) Date of Patent: Jun. 11, 2002

(54) METHOD FOR MINERALIZATION OF ORGANIC POLLUTANTS IN WATER BY CATALYTIC OZONIZATION

(75) Inventors: Sandrine Escude, Le Soler; Sylvie Baig, Nanterre; Michele Dartiguenave, Ramonville; Yolande Lucchese, Clermont Lefort; Cecile Legay, Pontgibaud; Jacques Molinier, Goyrans, all of (FR)

(73) Assignee: Degremont, Rueil Malmaison (FR)

( * ) Notice: Subject to any disclaimer, the term of this patent is extended or adjusted under 35 U.S.C. 154(b) by 0 days.

(21) Appl. No.: 09/719,859

(22) PCT Filed: Mar. 4, 1999

(86) PCT No.: PCT/FR99/01323

§ 371 (c)(1),
(2), (4) Date: Dec. 18, 2000

(87) PCT Pub. No.: WO99/65828

PCT Pub. Date: Dec. 23, 1999

(30) Foreign Application Priority Data

Jun. 18, 1998 (FR) ............................................. 98 07714

(51) Int. Cl.⁷ ............................... A61L 2/00; A61L 9/00
(52) U.S. Cl. ............................... 422/28; 422/24; 422/28; 422/177; 422/180; 422/186.06; 210/760; 210/763
(58) Field of Search .............................. 422/22, 23, 28, 422/177, 180, 186.06, 186.07; 210/760, 763

(56) References Cited

U.S. PATENT DOCUMENTS 5,192,452 A * 3/1993 Mitsui et al. .................. 422/28
5,207,877 A * 5/1993 Weinberg et al. ........... 204/130

* cited by examiner

*Primary Examiner*—Robert J. Warden, Sr.
*Assistant Examiner*—Imad Soubra
(74) *Attorney, Agent, or Firm*—Connolly Bove Lodge & Hutz, LLP

(57) ABSTRACT

A process of catalytic ozonization with molecular ozone or with a gas containing ozone, for the purification of polluted waters, comprising the step of activating the ozone with a catalyst consisting at least of cobalt atoms, in order to achieve the advanced oxidation of the organic pollutants contained in the waters by converting the Total Organic Carbon of the waters into carbon dioxide.

13 Claims, No Drawings

METHOD FOR MINERALIZATION OF ORGANIC POLLUTANTS IN WATER BY CATALYTIC OZONIZATION

The present invention relates to the advanced oxidation of organic pollutants of water. The invention relates more particularly to a catalytic ozonization process leading to a substantial mineralization of the organic matter present in an aqueous phase.

Organic matter is defined as the combination of oxidizable compounds which are conventionally quantified overall by the Chemical Oxygen Demand (COD) and the Biological Oxygen Demand (BOD); another parameter which is increasingly being used is the Total Organic Carbon (TOC).

On account of the simplicity of their use and their relatively low cost, biological processes are the purification techniques most commonly used for treating organic pollution. However, the activity of the microorganisms involved is limited to the removal of biodegradable organic compounds and may be inhibited in the presence of toxic substances. The treatment of non-biodegradable organic pollutants requires a chemical oxidation step.

The oldest process developed, which is known as wet-route oxidation, uses atmospheric oxygen to convert organic pollutants into carbon dioxide and water. The reaction requires operating conditions of high temperature and pressure which are located respectively in the ranges from 20° C. to 350° C. and $2 \times 10^6$ Pa to $2 \times 10^7$ Pa. In practice, the working pressure is greater than $8 \times 10^6$ Pa and the temperature is about 250° C. Metal catalysts have been developed to reduce the infrastructure and exploitation costs associated with the operating conditions. These catalysts may be homogeneous, introduced into the aqueous phase in the form of salts of the transition metals $Cu^{2+}$, $Fe^{2+}$, $Zn^{2+}$, $Co^{2+}$, etc., but in this case they impose the need for a subsequent separation treatment. Consequently, heterogeneous catalysts are nowadays developed, as disclosed in WO 96/13463 and U.S. Pat. No. 5,145,587. These solid catalysts are vanadium, chromium, manganese, iron, cobalt, nickel, copper, zinc, niobium, molybdenum, tungsten, ruthenium, rhodium, iridium, palladium, platinum, silver, gold or bismuth metal compounds, optionally as a mixture and deposited on a mineral support such as alumina, zeolites, silica, active charcoal, titanium dioxide, zirconia, ceria, etc. Wet-route oxidation achieves a consequent reduction of the COD of waste waters charged with organic matter, such as effluents from the distilling, papermaking, petrochemical, etc. industries. However, above and beyond the difficulty of carrying it out due to the corrosive reaction medium and the formation of mineral deposits, the application of wet-route oxidation remains limited because it produces oxygenated organic compounds of low molecular weight which are very slow to mineralize.

Among the chemical oxidants used in water treatment, ozone is the most powerful reagent (($E°(O_3)$=2.08 V, $E°(H_2O_2)$=1.78 V, $E°(ClOH)$=1.49 V, $E°(Cl_2)$=1.36 V, $E°(ClO_2)$=1.27 V, $E°(O_2)$=1.23 V). Given its reactivity towards organic compounds, the field of application of ozone covers the treatment of drinking waters, industrial waters and urban waste waters. Ozone is nowadays tending to replace chlorine in its role of disinfecting drinking waters on account of the absence of degradation products that are harmful to the organoleptic qualities, such as the color, odor and taste of the treated water. Ozone has been used for many years as a bactericide and virucide for drinking waters and more generally for oxidizing organic matter and micropollutants. Ozone is also the chemical oxidant of choice in the specific treatments of deferrization and demanganization. Ozonization can be applied as an additional treatment for a water which has a very high organic content, to help clarify it. Ozone converts organic pollutants into more polar compounds of lower molar masses and consequently improves their biodegradability and subsequent adsorption onto active charcoal (see for example GB 1 417 573 and FR-A-2 738 235. On account of its dipolar structure, ozone reacts readily with compounds containing unsaturation or sites of high electron density. In general, the rate of ozonization of different organic substrates follows the order of decreasing reactivity: thiol, amine, alkyne, alcohol, aldehyde, alkane, ketone, carboxylic acid and becomes very severely limiting from the alkanes onward. However, the oxidation of organic compounds generates in all cases products containing an oxygenated function which, like organochlorine compounds, are found to be inert with respect to ozone, as a result of which the overall reductions in total organic carbon remain low.

From a chemical point of view, the only means for obtaining advanced oxidation yields is to activate the oxidizing systems so as to form in the reaction medium species that are more reactive and less selective. The advanced chemical oxidation processes, known as AOPs, are based on the generation in the reaction medium of the hydroxyl radical, the redox potential of which is much higher than that of ozone ($E°(HO°)$=2.80 V). They involve a supply of chemical or photochemical energy to activate the ozone and induce the formation of hydroxyl radicals capable of oxidizing most organic pollutants to the point of complete mineralization.

The photochemical activation of ozone is achieved by UV irradiation and theoretically produces one mole of hydroxyl radical per 1.5 mol of ozone and 0.5 mol of photons consumed. Its efficacy is greatly limited by the presence of chromophoric substances and by the turbidity of the water to be treated, which impair the penetration of radiation. Furthermore, beside the cost engendered by the use of high-intensity irradiation, the complexity of the reactors adapted for the implementation constitutes the main stumbling block in the development of this technique (see for example U.S. Pat. Nos. 5,637,231, 5,178,755, EP-A-60941 and U.S. Pat. No. 3,924,139).

The chemical activation of ozone with hydrogen peroxide theoretically gives higher-quality performance than photochemical activation since one mole of hydroxyl radical results from the interaction of one mole of ozone and 0.5 mol of hydrogen peroxide. However, whereas the $O_3/H_2O_2$ combined system is shown to be particularly suitable for eliminating many organic micropollutants for the rendering of water fit for drinking, the gain in oxidation yield observed for industrial waste waters relative to ozonization depends greatly on the nature of the substrates to be oxidized (see for example FR-A-2 640 957, FR-A-2 563 208, FR-A-2 699 914, U.S. Pat. Nos. 4,792,407 and 4,849,114). Thus, the addition of hydrogen peroxide may prove to be entirely superfluous in the case where ozonization of the organic matter leads to the formation of hydrogen peroxide in situ. Moreover, the additional exploitation cost associated with the addition of hydrogen peroxide may be up to 100% compared with ozonization, excluding activation.

In any event, one of the major limitations of advanced oxidation processes such as ozonization with photochemical irradiation or in the presence of hydrogen peroxide lies in the mode of action itself of the oxidizing system. Specifically, free-radical-scavenging mineral or organic compounds can come into competition with the organic matter to be oxidized. This results in an inhibition of the radical-mediated oxidation process by diverting the flow of hydroxyl radicals and, consequently, a treatment efficacy which at best is equal to that of the ozonization excluding activation and a small reduction of total organic carbon. Now, ozone-decomposition inhibitors are compounds that are frequently encountered in variable concentration in waters to be treated: acetate, tert-butanol, saturated aliphatic compounds, carbonates, bicarbonates, phosphates, etc.

Another ozone activation route consists in promoting the oxidation by adsorbing the organic molecules. GB-A-2 269 167 discloses a process for ozonizing waste waters based on a specific placing in contact of the water with a mixture of ozone and oxygen. The organic pollutants in the water are oxidized by continuous or sequential injection of the gaseous mixture through a mixed charge of inert material and of carbon-based material placed in a reactor in alternate layers and which produces a convoluted flow of water. The carbon-based material such as charcoal or grains of active charcoal is similar to a catalyst on account of its adsorbent role with respect to the organic matter. The performance qualities of the installation are not exemplified.

Similarly, WO-90/14312 relates to a process and an installation for ozonization with UV activation or by solid catalyst for the removal of toxic organic pollutants such as halohydrocarbons. The catalysts described, active charcoal, alumina and/or silica, optionally doped with a transition metal, act as adsorbents with high affinity for organic compounds and ozone. They are characterized by a specific surface of greater than or equal to 50 $m^2/g$ for a pore volume at least equal to 0.1 $cm^3/g$ and are used as packed columns. Two examples illustrate the application of the ozone/active charcoal or ozone/active charcoal and silica oxidizing system for reducing low concentrations of specific organic compounds.

EP-A-0 625 482 discloses a process and its installation for oxidizing effluents charged with organic matter, which also involve an adsorption on a mineral support and the continuous or sequential ozonization of the organic pollutants retained. The adsorbent support described may be active charcoal, activated alumina, copper oxide, magnesium oxide, titanium dioxide or zinc oxide, alone or as a mixture. The support preferably used is activated alumina on account of its inertness with respect to ozone. The dose of ozone involved in the process can range from 0.1 to 2 g/g COD of the effluent to be treated, the reaction route targeted being the radical-mediated oxidation of the organic matter concentrated on the adsorbent support by the hydroxyl radicals formed in situ from ozone. The installation uses a reactor which is at least partially filled with adsorbent material with optionally alternating admission, in ascending co-current mode of the effluent and the ozoner-containing gas with a circuit for recycling the effluent. In the case of continuous ozonization, it also involves the injection of an ozone-decomposing agent such as hydrogen peroxide, sodium hydroxide, calcium oxide, sodium sulfite, sodium hyposulfite, sulfur dioxide, ultraviolet irradiation or ultrasound irradiation. The examples are devoted to the application of the process to the reduction of the peroxide number and the UV absorbance of a river water and to the reduction of the COD of a discharge lixiviate. They show, respectively, the beneficial effects of the batchwise injection of ozone over the continuous mode and the sequential addition of hydrogen peroxide, and justify the preference of alumina as an adsorbent material over active charcoal or non-adsorbent materials such as quartz or schist.

Other publications disclose the use of the inorganic materials used above for their adsorbent capacity as heterogeneous ozonization catalysts. EP-A-0 436 409 proposes a process of ozonization in the presence of titanium dioxide in order to significantly increase the oxidizing power of ozone with regard to organic matter, reductive mineral elements and microorganisms. The titanium dioxide is used either in pure form or bound to a mineral support such as ceramic or an organic support such as a synthetic polymer, and it is placed in the form of grains 30 to 500 microns in diameter, packing components or ceramic micro- or ultrafiltration membrane. Its form depends on the technology used: fluidized-bed or fixed-bed ozonization reactor, with subsequent membrane separation. The rate of ozonization ranges between 0.5 and 10 mg of ozone/l for an amount of titanium dioxide in recirculation of from 0.1 to 15 g./l. The efficacy of the treatment is improved by adding a homogeneous catalyst consisting of a metal salt of copper, aluminum, silver, zinc, nickel, titanium, manganese or, preferably, iron, which is subsequently separated from the treated water in hydroxide form. Two examples demonstrate the effect of the presence of titanium dioxide in the case of eliminating a pesticide, on the one hand, and in the case of eliminating organic matter of natural origin, on the other hand.

WO 96/21623 relates to an installation for treating waste waters comprising a reactor operating under pressure, containing a granular catalyst and fed with a fluid consisting of a mixture of ozoner-containing gas and effluent. This known technique is directed towards simplifying the implementation of the ozonization process with final catalytic decomposition of the ozone in a gas/liquid/solid three-phase system. By means of a pump, the installation disclosed ensures supersaturation of the effluent with ozone. The resulting fluid free of gas bubbles feeds, in ascending currents, an ozonization reactor with a catalytic bed at the top. The only indication relating to the catalyst concerns its granular morphology.

According to the same principle, WO 97/14657 discloses a process for the advanced oxidation of waste waters which links in sequence a direct ozonization of the effluent to oxidize the reactive pollutants and to dissolve the ozone and an oxidation with dissolved ozone activated in the presence of a solid catalyst to oxidize pollutants that are inert with respect to ozone. This process involves known solid catalysts that are usually used in the field of chemical synthesis and the advanced oxidation of water: oxide of the transition metals cobalt, copper, iron, manganese or nickel optionally supported on alumina, silica/alumina, silica gel, active charcoal, titanium dioxide or zirconia. Among these, the catalyst of choice is undoped γ-alumina which is optionally supported, preferably on α-alumina. The disclosure of the invention also mentions the physicochemical characteristics of the catalysts in the form of granules, pellets or monoliths of low specific surface ($\leq 20$ $m^2/g$) and/or of high porosity ($\geq 2$ pores/linear cm) and having a low pressure drop ($\leq 0.1 \times 10^5$ Pa.g). This process is applicable to the treatment of waste waters with a COD of less than or equal to 5000 mg/l with the aim of lowering the COD to about 125 mg/l. Two implementation schemes are proposed depending on the initial COD value of the effluent to be treated: a direct ozonization reactor with co-current supply of gas and liquid, a catalytic reactor in series in which the effluent circulates in ascending current, optionally with recycling into the gas/liquid contactor. The examples concern the reduction of the COD of a synthetic glucose solution by ozonization in the presence of various commercial catalysts compared with ozonization with photochemical activation. They reveal the higher activity of the γ-$Al_2O_3$ catalyst compared with MgO, the latter being more effective than catalysts containing 3% and 18% of supported cobalt oxide.

FR-A-2 291 687 is based on the use of oxidation catalysts that are known for improving the performance qualities of ozonization in the removal of oxidizable compounds in terms of amounts of ozone required. Many elementary formulations of catalysts are cited, but the only use claimed is that of catalysts comprising an insoluble chromium, manganese, vanadium or copper oxide on a mineral support and whose composition is to be adapted as a function of the nature of the substrate to be oxidized. The examples compare the elimination of sulfur by co-current ozonization in the presence of various catalyst pearls deposited in a fixed bed. They show that the amount of ozone required reduces according to the sequence of increasing activity of the catalysts: platinum-on-alumina, chromium-on-silico-aluminate, copper/chromium mixture on alumina.

U.S. Pat. No. 4,040,982 specifies a single ozonization catalyst formulation for the elimination of waste water pollutants. This heterogeneous catalyst consists of from 1% to 20% by mass of ferric oxide deposited on catalytically active alumina. Furthermore, it is characterized from the physicochemical point of view by a specific surface of between 150 $m^2$/mg and 450 $m^2$/g and a pore volume of at least 0.3 $cm^3$/g. It is developed by impregnating γ-alumina. or η-alumina, amorphous alumina or activated alumina with a ferric salt solution, drying at 100–180° C., calcination of the resulting product at 510–570° C. and placing in the shape of beads or extrudates. The examples concern the ozonization in a tubular reactor, in counter-current flow, of a water contaminated with phenol. The catalyst used and considered as the best is composed of 10% ferric oxide on γ-alumina with a specific surface of 370 $m^2$/g for a pore volume of 0.95 $cm^3$/g.

U.S. Pat. No. 4,007,118 confirms the use of a powdered manganese, iron, copper or nickel metal oxide in an ozonization process for the disinfection or organic depollution of waste water. The ozonization is carried out by injection of ozone into a reactor containing the catalyst placed in cloth bags, deposited on a support or dispersed in the effluent to be treated. The examples mentioned in said publication relate to the reduction of the ozonization time required in the presence of the catalysts to achieve a 25% reduction of a concentration of 0.25 mg/l of quinoline in a synthetic effluent. They illustrate the effect of the pH and the temperature of the reaction medium and demonstrate the increasing order of activity of the catalysts according to the sequence NiO, $Mn_2O_3$ or $Fe_2O_3$ and CuO.

Patent EP-A-354 664 relates to a more elaborate catalyst to be used in the treatment of waste water with ozone for deodorization, sterilization and decolorization or for decomposition of the residual dissolved ozone. Two types of constituent form part of the formulation of the catalyst to make it sufficiently active. The first component may be titanium oxide, silicon oxide, aluminum oxide and/or zirconium oxide and the second component belongs to the broad group of metals including manganese, iron, cobalt, nickel, cerium, tungsten, copper, silver, gold, platinum, palladium, rhodium, ruthenium and iridium and any compound of these metals which is sparingly soluble in water. It is specified that each component used separately leads to catalysts of poor activity and unstable quality. More specifically, the catalyst which is the subject of the invention is composed of 70% to 99.99% of the first type of constituent and of 30% to 0.01% of the second type of constituent. The development method disclosed as advantageous consists in mixing the first powdered constituent in water with the transition metal and/or the precious metal, molding the resulting mixture, drying it at 50–120° C. and calcinating the solid for 1 to 10 h at a temperature of between 300° C. and 800° C. The catalyst is in the form of pellets or honeycombs of given dimensions for use in a fixed bed for a treatment flow rate of less than 1 $m^3$/h.$m^3$. Many examples reported corroborate the composition variety of the active catalysts. The combination of catalysts consisting of titanium oxide and/or silica and/or zirconia or alumina as first component and of the transition metals cerium, rhodium, manganese, iron, copper, silver, nickel, platinum, ruthenium, iridium, gold, palladium or cobalt as second component leads quickly to the same degrees of elimination of the color, the odor, colibacilli and residual dissolved ozone in a secondary effluent and to virtually equivalent yields for the decomposition of dissolved ozone in synthetic aqueous solution.

Patent EP-A-0 361 385 restricts the range of analogous catalyst constituents applied for the deodorization of polluted gases with ozone. The composition of the catalysts includes, on the one hand, an active element, i.e. at least one oxide of the transition metals copper, manganese, cobalt, iron and nickel, and, on the other hand, a support material chosen from titanium dioxide, silver oxide and gold. The proportion of the active metal catalyst can vary within a wide range from 25% to 95% and at best is greater than 50%, to ensure the efficacy of the treatment and the lifetime of the catalyst. It is manufactured and shaped according to the techniques tested preferentially so as to produce a material having a surface layer of active element in a thickness of between 10 $\mu$m and 200 $\mu$m to promote the adsorption is of the malodorous compounds. The examples show that the catalysts according to the invention are effective in eliminating, with ozone in a gaseous phase, hydrogen sulfide, ammonia, methylamine and residual ozone without any significant variation in the elimination yields as a function of the nature of the elements constituting the catalysts.

More recently, WO 97/08101 discloses a process for purifying waste waters by oxidation at ambient temperature and pressure in the presence of hydrogen peroxide, oxygen or ozone and a heterogeneous catalyst consisting of an element from the group of transition metals, alkali metals or alkaline-earth metals, in pure form or as a mixture and supported on a metal oxide. This process is intended for the treatment of industrial waste waters charged with organic pollutants to reduce their COD. The oxidizing agent is used in combination with a catalyst prepared by impregnating the support material with an aqueous or organic solution of the element. The elemental composition which is preferred for the catalyst comprises one or more metals of the group ruthenium, cobalt, iron, copper, manganese and lithium supported on one or more metal oxides from among lead oxide, zirconium oxide, titanium oxide and magnesium oxide, and at best corresponds to iron deposited on magnesium oxide, dried and calcinated at 400° C. for two hours. The catalytic oxidation can be carried out using the catalyst in the form of powder, pellets or granules in a conventional catalytic reactor at a treatment flow rate of less than 1 $m^3$ of effluent/h.$m^3$ of catalyst and with adjustment of the pH preferably to above pH 6. The catalyst can be recycled after regeneration by drying and calcination. Only one example concerns ozonization. In said example, the catalytic ozonization is applied to a synthetic effluent of dyes in the presence of catalysts containing 2% metal: Fe/MgO, Cu—Fe/MgO, Cu/MgO, Mn/MgO and Fe—Cu—Mn/MgO. The COD reductions measured justify the choice of iron on magnesium oxide as the best catalyst.

The prior art regarding ozonization in the presence of a catalyst for the treatment of water reveals a wide disparity in the very nature of the catalysts used. Some processes use inorganic materials such as active charcoal, alumina, silica, oxides of copper, magnesium or zinc or titanium dioxide, which are selected for their capacity to adsorb organic matter, which can promote the oxidation of the compounds retained with ozone by promoting contact between the reagents.

Other processes propose the use of heterogeneous catalysts consisting of a mineral material which are optionally doped with a metal element such as cobalt, copper, iron, manganese, nickel, chromium, vanadium, ruthenium, lithium, etc., and developed in the fields of organic synthesis and water purification for the oxidation of organic compounds mainly with oxygen.

Finally, other processes use catalysts that are more specific for ozonization but whose compositions vary both on the basis of the nature of the mineral support and on the nature of the metal element deposited (chromium, manganese, iron, vanadium, copper, nickel, etc.), one of the reasons put forward being the necessary adaptation of the catalyst to the nature of the organic compounds to be eliminated. Moreover, this combination of catalytic ozonization processes bases the demonstration of the sound reasoning for the use of a catalyst in the ozonization for the elimination of organic matter in improving the levels of reduction either in the Chemical Oxygen Demand or in the concentrations of specific compounds. Now, these two parameters, although necessary, may prove to be insufficient to assess the extent of the mineralization of the organic pollutants with ozone.

Fundamentally, a catalyst is defined as a substance capable of exerting an accelerating effect and an orienting effect on the progress of a thermo-dynamically possible chemical reaction; what is more, it must be found in unchanged form at the end of the reaction, the thermodynamic equilibrium of which it consequently cannot modify. In a homogeneous phase, the reagents and the soluble catalyst are uniformly distributed in the reaction medium. In contact catalysis or heterogeneous catalysis, the reaction takes place between reagents adsorbed onto the surface of the catalyst. The catalytic cycle involves the following consecutive steps, which are of varying influence on the overall rate of the chemical conversion:

diffusion of the reagents toward the catalyst;
interaction of the reagents with the catalyst (adsoprtion);
reaction between the adsorbed reagents to give the products;
desorption of the products at the surface of the catalyst towards the medium, which is usually liquid;
diffusion of the products away from the catalyst.

Whereas the first and last steps correspond to physical processes of matter transfer, the intermediate steps involve chemical phenomena, the reaction taking lace between the chemically adsorbed species by arrangement of surface complexes. Consequently, it appears that although, during the catalytic ozonization, the adsorption of the organic pollutants onto the surface of the catalyst should be promoted, it constitutes only a first step in the chemical reaction. As such, it cannot suffice to initiate the catalytic cycle. The catalyst cannot therefore be selected only on the basis of its capacity to adsorb organic matter, and all the more so since in order to be relatively unspecific and thus advantageous to a broad spectrum of compounds, the adsorption must be limited to a physical adsorption involving Van der Waals forces.

At the level of the catalytic act, the physical adsorption presents only one point of interest: allowing the subsequent chemical adsorption. This chemical adsorption, on the other hand, has the same characteristics as a chemical reaction: it results in the formation of covalent or ionic bonds between the surface of the catalyst and the adsorbed pollutant molecule. However, as for the physical adsorption, the chemical adsorption of the substrate does not necessarily lead to the catalytic reaction: when it is too strong, it becomes irreversible and leads to poisoning of the catalyst. Similarly, reaction products that are too strongly chemically adsorbed onto the catalyst can prevent access of the reagents to the active surface and inhibit the subsequent reactions. Moreover, in contrast with the physical adsorption, chemical adsorption is very specific and consequently conditions the activity of the mineral species in the catalysis of the reaction. Given the diversity of organic pollutants contained in waters to be treated, these fundamental considerations explain the wide variety of catalysts developed in the prior art of catalytic ozonization.

In addition, the oxidation catalysts previously developed in the fields of organic synthesis and, by extrapolation, of water purification are designed to activate hydrogen peroxide, organic peroxides and oxygen (R. L. Augustine, in "Heterogeneous Catalysis for the Synthetic Chemist", chapter 21, Marcel Dekker Inc., New York, 1996; G. Strukul, in "Catalytic Oxidations with Hydrogen Peroxide as Oxidant", Catalysis by Metal Complexes, volume 9, R. Ugo and B. R. James, Kluwer Academic Publishers, Dordrecht, 1992). It is known that many metals in homogeneous or heterogeneous form are capable of forming more reactive oxidant species from these primary oxidants. It is accepted in particular that, among these, metals with a one-electron redox couple catalyze the homolytic oxidation of organic substrates nonselectively in aqueous medium, two-electron oxidation also being possible. In all cases, the activity of the metal is recognized as being essential in propagating the chain of radical-mediated reactions. The mode of radical-mediated action of these oxidation catalysts used for water treatment again poses the problem of the inhibitory effect of certain free-radical-scavenging mineral and organic compounds. In this sense, the use, in the course of the ozonization, of catalysts developed to activate oxygen and/or hydrogen peroxide rejoins the routes for activating ozone by UV radiation or addition of hydrogen peroxide. Furthermore, the variety of catalysts which can be envisaged is such that it justifies the diversity of catalysts proposed in the prior art of catalytic ozonization.

The prior art described above shows the difficulty in defining a broad-spectrum ozonization catalyst for eliminating the organic matter contained in polluted waters. Starting with this problem, the present invention proposes to provide a solution which consists of a catalytic ozonization process for water treatment, which is of universal nature on the one hand, and which allows a substantial reduction in the Total Organic Carbon on the other hand.

Consequently, a subject of this invention is a process of catalytic ozonization with molecular ozone or with a gas containing ozone, for the purification of waste waters, characterized in that it consists in activating the ozone with a catalyst consisting at least of cobalt atoms, in order to achieve the advanced oxidation of the organic pollutants contained in the waters by converting the Total Organic Carbon of the waters into carbon dioxide.

Thus, the invention provides a process for the oxidation mainly into carbon dioxide and water, with molecular ozone or a gas containing it, of compounds containing an aliphatic or cyclic, saturated or unsaturated carbon-based chain, bearing hydrogen atoms and/or oxygen-containing, nitrogen-containing, phosphorus-containing or sulfur-containing functional groups and/or halogen-containing substituents, these compounds being gases and/or liquids and/or solids contained in or derived from polluted water, in the presence of a catalyst consisting at least of cobalt atoms.

As may be appreciated, the catalyst used according to the process of the invention and developed according to a rigorous methodology constitutes the very essence of the catalytic ozonization process which is the subject of the present invention, and gives it its originality and efficacy. The ozone/catalyst oxidizing system according to the invention allows the mineralization of the organic pollutants of water according to an entirely catalytic process initiated by the formation of a metallic cobalt species of very high oxidizing power by reacting the active agent of the catalyst with ozone. The mineralization of the organic substrates and the reduction of the Total Organic Carbon resulting therefrom proceeds by successive reactions with the active cobalt species up to the release principally of carbon dioxide. Specifically, the mode of action of the ozonization catalyst involves a process of molecular type which is capable of bringing about the cleavage of covalent bonds present in the organic molecules, i.e. the carbon-carbon, carbon-oxygen, carbon-nitrogen, carbon-phosphorus, carbon-sulfur, carbon-hydrogen, carbon-halogen, etc. bonds. In parallel with the release of carbon dioxide from the carbon elements, the ozonization catalyst brings about the elimination of the hetero elements nitrogen, phosphorus and sulfur in their most oxidized form, as nitrate, phosphate and sulfate, respectively.

Accordingly, the advantage of the catalytic ozonization process according to the invention is manifold. Firstly, the increase in the oxidizing power of ozone under the effect of the active agent of the catalyst allows levels of reduction of the Total Organic Carbon which can reach values of greater than 95% irrespective of the initial TOC contents of the treated waters. Secondly, the increased reactivity of the organic pollutants in the presence of the ozone/catalyst oxidant system leads in particular to a consequent reduction in the amount of ozone required to achieve a given Total Organic Carbon elimination when compared with other types of ozonization as described in the prior art.

Moreover, with regard to the mode of action of the ozone/catalyst couple, large reductions in the organic nitrogen, phosphorus and sulfur contents can be obtained simultaneously with the reduction in the Total Organic Carbon. Consequently, the risks of the catalyst being poisoned which are usually encountered in the prior art, in the presence of sulfur-containing or nitrogen-containing compounds or by deposition of carbon dioxide in the form of carbonate, are excluded. Furthermore, according to specific studies, the ozone/catalyst system operates without intervention of radical species generated. Thus, the inhibition problems mentioned in the prior art during the radical-mediated activation of ozone in the presence of numerous radical-scavenging compounds is avoided.

On account of all of the advantages it affords, associated with the activity of the cobalt active agent, the ozonization catalyst is of unique nature when compared with the action of transition metals in the ozonization of organic pollutants as disclosed in the prior art (see for example R. Gracia, J. L. Aragües, J. L. Ovelleiro, Ozone Science & Engineering, 18, 195–208, 1996).

In this respect, the catalytic ozonization process according to the invention can be carried out advantageously to achieve a low Total Organic Carbon content and a low related COD value in accordance with the usual regulations, and/or can be included in a more complex treatment procedure to exploit judicious combinations known to those skilled in the art.

The organic compounds more particularly targeted by the process of the invention correspond to the substances that are the least reactive with or even inert with respect to ozone with or without activation as described in the prior art, namely, by way of indication, alkanes, ketones and carboxylic acids. Accordingly, the field of application can cover all the ranges of waters to be treated from waters to be made fit for consumption to industrial waste waters.

Specifically, it has been found, surprisingly in view of the prior art, that cobalt shows a particular activity with respect to ozone, when compared with other metal elements such as titanium, vanadium, chromium, manganese, iron, nickel, copper, zinc, zirconium, molybdenum and tin. The specificity of cobalt in the activation of ozone is clearly demonstrated by the empirical classification established from the metallic precursors in the form of dissolved salts and/or of insoluble oxides that are pure or supported on a mineral material placed in contact with a continuously ozonized aqueous solution. The classification taking account both of the reactivity of the different metals and of their stability and regenerability demonstrates the exceptional catalytic activity of cobalt when compared with the other metals (Table 1 below). The relative activity of the metals as presented in this Table 1 is defined as mentioned below from the rotation frequency $\rho$ for a time $t_1$ corresponding to the ozone stoichiometry: metal equal to 5, corrected by the degree of variation of the rotation frequency $\Delta\rho$ for a time $t_2$ equal to twice $t_1$, corrected by the degree of loss of metal $\Delta M$, and expressed for each metal relative to cobalt taken as reference:

$$\rho = \frac{\text{number of moles of ozone consumed}}{\text{number of moles of metal } M \cdot t_1}$$

$$\text{activity of the metal } M = \frac{\rho_{t_1} \cdot \Delta\rho_{t_2}}{\Delta M}$$

$$\text{relative activity of the metal } M = \frac{\text{activity of the metal } M}{\text{activity of the cobalt}}$$

TABLE 1

| Metals | Ti, Zr, V, Cr, Mo, Fe, Cu, Zn, Sn | Mn, Ni | Co |
|---|---|---|---|
| % relative activity | 0 | 20–30 | 100 |
| Class | C | B | A |

On the basis of this entirely reproducible classification, cobalt as active agent differs from the metals of classes B and C by a higher rate of reaction with ozone, the absence of impairment of the activity and optimal regeneration. The combination of enhancements observed for the cobalt-based catalyst is inherent in the specific reaction between cobalt and ozone which initiates the catalytic cycle by forming a metallic cobalt species of oxidation state III which is characterized by a high oxidizing power and whose change in the reaction medium makes it possible to regenerate the precursor of the active cobalt species of oxidation state II. It has been shown by advanced mechanistic studies that the activation of ozone with the cobalt catalyst takes place without the formation of radicals and/or peroxides, the species often being mentioned in the prior art to explain the reactivity of ozone with metals. On account of the specific qualities described above, the ozonization catalyst containing cobalt compared with other metals is also reflected by an enhancement in the yields for mineralization of the organic matter and substantial industrial gains, namely: a smaller reactor volume, the use of a smaller amount of catalyst, a reduced contact time, a higher lifetime, a minimized loss of metal. As a result, the originality of the composition of the ozonization catalyst which is an essential subject of the present invention constitutes a genuine advance over the catalytic ozonization of the prior art.

The catalyst can be introduced conventionally into the ozonization medium in soluble or insoluble forms corresponding, respectively, to homogeneous and heterogeneous catalysis types. The homogeneous catalyst according to the invention can be any water-soluble cobalt compound in oxidation states II and III: organometallic complexes or, preferably, salts of halide, carboxylate, nitrate, sulfate, thiocyanate, etc. anions. Although homogeneous catalysis offers the advantage of being easy to carry out, this method generally has the drawback of requiring a subsequent physicochemical step for separating out the metal ion in solution.

The cobalt catalyst according to the invention is preferably heterogeneous: either in bulk form in the form of pure or mixed insoluble oxides, or in supported form. Said catalyst is advantageously deposited onto a mineral support whose role is to give the catalyst its texture, mechanical strength, morphology and possibly a certain amount of activity.

The support material may be an oxide of the elements silicon, tin, aluminum, zinc, copper, nickel, iron, manganese, chromium, molybdenum, vanadium, titanium, zirconium, cerium, magnesium, calcium, strontium or barium or a mixture thereof, optionally containing phosphate or sulfate groups. The catalyst preferably consists of cobalt deposited on a mineral support of acidic or redox nature such as silica, alumina, titanium dioxide, zirconia, tin dioxide or iron oxide, which are in pure or mixed form. Among the latter, the support preferably used is, in the following order, silica, titanium dioxide, zirconium dioxide. Specifically, although all the supports envisaged have been shown to be catalytically inactive with respect to ozone, it appears that, depending on its nature, the support can promote the activity of the deposited cobalt by virtue of a participating effect associated with its surface properties which condition the electronic environment of the metal. For an equivalent metal content, the use of silica as support affords a 30% increase in the activity of the cobalt when compared with the cobalt-on-alumina catalyst. As regards the physicochemical characteristics, the supports used have a specific surface ranging from 10 $m^2/g$ to 700 $m^2/g$ for a pore volume of from 0.1 ml/g to 1.3 ml/g.

The amount of cobalt deposited can vary within a wide range and will be determined during the preparation of the heterogeneous catalysts. It may be indicated in general that cobalt represents from 0.1% to 20% by mass relative to the total mass of the catalyst, without these limit values being absolute. However, contents that are too low needlessly dilute the active agent of the catalyst, while contents that are too high run the risk of bringing about a long-term partial dissolution of the cobalt, during the use of the catalyst.

Besides cobalt, the heterogeneous catalysts used can also contain one or more elements which can promote the activity of cobalt by a synergistic effect. According to one variant of the invention, cobalt and an element from groups 4a, 5a and the transition metals of the Periodic Table of the Elements are codeposited on the mineral support. Such elements which may be deposited with cobalt are, for, example, bismuth, copper, manganese, chromium, molybdenum and vanadium. The synergistic effect observed can provide up to 20% of the gain in the activity of cobalt, whereas, individually, these elements are found to have little activity or even to be inert under the same ozonization conditions.

The heterogeneous catalyst is prepared according to the known techniques, which a person skilled in the art is capable of adapting, as a function of the amount of cobalt as well as, optionally, the nature and amounts of the other elements to be incorporated into the mineral matrix of the support. The combination of preparation methods is divided into two general categories: coprecipitation and impregnation. In general, the compounds of the various elements forming part of the composition of the catalyst, i.e. a source of cobalt, for the support, a source of silicon, tin, aluminum, zinc, copper, nickel, iron, manganese, chromium, molybdenum, vanadium, titanium, zirconium, cerium, magnesium, calcium, strontium or barium, and optionally a source of sulfate or phosphate ions and of the other elements to be incorporated, are mixed in the desired proportions, along with a structuring agent and a mobilizing agent. The coprecipitation applies when using precursor compounds of the various elements that are soluble in the presence of the structuring agent and to which is added a precipitating agent. The impregnation describes the deposition of the active element dissolved in the presence of the structuring agent onto the insoluble support material which has optionally already been placed in shape, by precipitation under the effect of the mobilizing agent. The structuring agent is, for example, an amine or a quaternary ammonium salt. The mobilizing agent may be in particular a hydroxide, a fluoride or an amine. The mixture obtained according to the two techniques is then subjected to a hydrothermal treatment at between 100° C. and 300° C. or to a maturation at less than 100° C. The resulting solid material is separated from the liquid phase according to the conventional techniques of solid/liquid separation, preferably by filtration, and is then washed, preferably with water. The material obtained undergoes a drying operation preferably carried out at a temperature of 100° C. and under atmospheric pressure. Finally, it is calcinated in air, at a temperature of between 300° C. and 800° C., preferably between 400° C. and 600° C.

The final catalyst can be used in any solid form arising from the known shaping techniques or corresponding to the morphology of the preexisting support material: powder consisting of micrograms, beads, pellets, extrudates, crushed particles. These techniques allow the catalyst to be placed in a divided form or in the form of a monolithic structure such as packing for columns, or tubular or flat membranes.

The amount of catalyst used may be extremely variable depending on the continuous, semi-continuous or batchwise implementation conditions of the process. The oxidation is preferably carried out -in aqueous phase, although the use of an organic solvent may be envisaged for specific purposes such as the upgrading of a reaction product from specific effluents. The ozoner-containing gas used may be a mixture of ozone and oxygen or a mixture of ozone and air or a mixture of ozone and an inert carrier gas. The temperature at which the catalytic ozonization reaction is carried out is variable depending on the temperature of the water to be treated. It is generally less than 100° C. The pressure may also be greater than or equal to atmospheric pressure. As a guide, it is generally between $10^5$ Pa and $5 \times 10^5$ Pa. The reactivity of the ozone/catalyst oxidant system does not require a pH adjustment. Thus, the catalytic ozonization can be applied to the water to be treated at its natural pH.

The catalytic ozonization treatment according to the invention can be carried out using the reactors known in the field of gas/liquid and gas/liquid/solid contact depending on the type of homogeneous or heterogeneous catalysis involved. Heterogeneous catalysis is particularly suited to a continuous or semicontinuous functioning of the process. In this case, the catalyst may be deposited in the ozonization reactor in a single or multiple fixed bed, in a mobile bed, in a fluidized bed or in a boiling bed. The ozone-containing gas is introduced into the reactor containing the water to be treated by the various known gas diffusion means. If necessary, the catalyst can be removed, regenerated and recycled during the implementation of the process.

A number of examples relating, on the one hand, to the preparation of the catalyst, and, on the other hand, to the treatment of the effluents according to the catalytic process which is the subject of this invention, are given below in order to illustrate the invention and certain embodiments thereof. Needless to say, however, these examples have no limiting nature.

EXAMPLE 1
Preparation of the Catalyst by Impregnation

A solution of 10.2 g of cobalt sulfate ($CoSO_4.7H_2O$) in 200 ml of water is added to 100 g of silica. 200 ml of concentrated (28%) aqueous ammoniacal solution are gradually added to the resulting solution with stirring in order to reach a pH approximately equal to 11.

The reaction mixture is stirred vigorously at room temperature for 4 h. The solid is recovered by filtration, washed with water and then air-dried at 100° C. and finally calcinated up to a temperature of 400° C. for 1 h.

A catalyst containing 2% of Co supported on silica is thus obtained.

EXAMPLE 2
Preparation of the Catalyst by Coprecipitation

A solution of 10.2 g of cobalt sulfate ($CoSO_4.7H_2O$) in 200 ml of water is added with stirring to a mixture of 116 ml of titanium tetrachloride and 298 ml of tetraethoxysilane diluted in 700 ml of ethanol. 1.3 l of dilute (6%) aqueous ammoniacal solution are gradually added with stirring to the gel thus formed in order to reach a pH approximately equal to 11.

The reaction mixture is stirred vigorously at room temperature for 4 h and then heated at 100° C. for 5 h. The resulting solid is recovered by filtration, washed with water and then air-dried at 100° C. and finally calcinated up to a temperature of 400° C. for 1 h.

A catalyst containing 2% of Co on a mixed $SiO_2$—$TiO_2$ support is thus obtained.

EXAMPLE 3
Treatment of Model Organic Compounds

Aqueous solutions of various model organic compounds are treated by ozonization in a bubble reactor. The initial Total Organic Carbon of the solutions is equivalent and equal to 200 mgC/l except in the case of p-chlorobenzoic acid, for which it is limited to 30 mgC/l due to the solubility of the compound.

The following experiments were carried out:
a) an ozonization treatment without active agent,
b) a treatment according to the invention in the presence of 7 g/l of cobalt suspended in the form of a $Co/SiO_2$ heterogeneous catalyst containing 11% cobalt by mass.

For an equal dose of ozone adapted to the nature of the compounds, the two treatments lead to the results given in Table 2 below:

TABLE 2

| Degree of reduction of TOC ($\Delta$TOC) or of COD ($\Delta$COD) as a function of the oxidant system | % $\Delta$TOC | | % $\Delta$COD | |
|---|---|---|---|---|
| | $O_3$ | $O_3$ + $Co/SiO_3$ | $O_3$ | $O_3$ $Co/SiO_3$ |
| Hexanoic acid | 0 | 96 | 0 | 95 |
| Hexanol | 0 | 74 | 11 | 82 |
| Methyl isobutyl ketone | 0 | 55 | 0 | 59 |
| Glycine | 93 | 98 | 90 | 100 |
| Mercaptoethanol | 12 | 78 | 45 | 89 |
| p-Chlorobenzoic acid | 40 | 100 | | |

The combination of results obtained shows that the catalyst makes it possible to achieve high degrees of mineralization, or high degrees of reduction of TOC and consequently of COD, whereas the performance levels of the ozonization without catalyst under the same conditions are limited. The degree of mineralization can be greater than 95% in the case of the catalytic ozonization, even starting with compounds shown to be inert in the ozonization in the absence of catalyst.

EXAMPLE 4
Treatment of a Discharge Lixiviate of Household Waste

The tests were carried out using a lixiviate which was biologically pretreated in a membrane bioreactor and having, at the start of ozonization, the following characteristics:

pH: 7.5
TOC: 200 mg/l
COD: 540 mg/l
TKN: 26 mg/l
MalK: 78° C.

Three types of ozonization were carried out in a bubble column under the same conditions of contact time and of continuous injection of the ozone-containing gas:
a) ozonization without activation
b) ozonization with sequential addition of hydrogen peroxide according to the $H_2O_2/O_3$ mass ratio equal to 0.3 g/g, at a pH adjusted to 7.5
c) ozonization in the presence of 7 g/l of cobalt suspended in the form of a $Co/SiO_2$ catalyst containing 11% by mass of cobalt.

The results obtained are given in Table 3 below:

TABLE 3

| Dose of ozone | | | | Final | | Final |
|---|---|---|---|---|---|---|
| g $O_3$/ g TOC | g $O_3$/ g COD | Oxidant system | $\Delta$TOC % | TOC mg/l | $\Delta$COD % | COD mg/l |
| 2.6 | 0.9 | $O_3$ | 32 | 136 | 41 | 319 |
| 2.6 | 0.9 | $O_3$ + $H_2O_2$ | 32 | 136 | 42 | 313 |
| 2.6 | 0.9 | $O_3$ + $Co/SiO_2$ | 64 | 72 | 71 | 157 |
| 5.2 | 1.8 | $O_3$ | 62 | 76 | 66 | 184 |
| 5.2 | 1.8 | $O_3$ + $H_2O_2$ | 66 | 68 | 77 | 124 |
| 5.2 | 1.8 | $O_3$ + $Co/SiO_2$ | 77 | 46 | 80 | 108 |

This Table 3 shows that for the same dose of ozone, the catalytic ozonization produces a substantial increase in the degrees of reduction of TOC and COD when compared with treatments with ozone without activation or with addition of hydrogen peroxide.

For this effluent, the discharge standards require a final COD value of less than or equal to 150 mg/l achieved for a minimum degree of reduction of the TOC of 70%. According to the following kinetics of the various ozonization treatments applied, this regulatory value is achieved for ozone doses which vary according to the ozonization treatment. It appears that the catalytic ozonization leads to a consequent reduction in the dose of ozone required to comply with the regulations. The gain brought about in terms of overall amount of oxidant required for the same reduction in the TOC is up to 55% compared with the ozonization with addition of hydrogen peroxide and 48% compared with the ozonization without activation.

EXAMPLE 5
Treatment of an Agrifood Effluent

This effluent, biologically pretreated by methanization followed by an aerobic treatment with nitrification/denitrification, was continuously ozonized in a bubble contactor until a degree of decolorization of 90% was obtained.

The characteristics of the effluent at the start of ozonization are given below:

pH: 7.9
TOC: 932 mg/l
COD: 2540 mg/l
Color: 6330° Hazen
TKN: 183 mg/l

Two tests were carried out under the same conditions of contact time and of injection of ozone-containing gas:
a) ozonization without activation
b) ozonization in the presence of 3 g/l of cobalt in the form of the heterogeneous catalyst containing 4% by mass of cobalt deposited in a fixed bed.

The doses of ozone required, expressed in mg of ozone per l of effluent, are given in Table 4 below:

TABLE 4

| % Decoloration | Oxidant system | Dose of ozone mg $O_3$/l | $\Delta$TOC % | $\Delta$COD % | $\Delta$NTK % |
|---|---|---|---|---|---|
| 90 | $O_3$ | 2100 | 32 | 49 | 24 |
| 90 | $O_3$ + Co/SiO$_2$ | 950 | 34 | 52 | 40 |

According to these values, the 90% decolorization is achieved for a 950 mg/l dose of ozone in catalytic ozonization, as compared with 2100 mg/l in ozonization without catalyst. Using a dose of ozone reduced by 55%, the catalytic ozonization leads to degrees of reduction of TOC, COD and TKN that are similar to or greater than those resulting from the ozonization without active agent. Moreover, analysis of the catalyst after reaction shows that the organic matter retained represents less than 1% of the mass of final catalyst, thus excluding a phenomenon of depollution by adsorption.

EXAMPLE 6
Treatment of an Organic Synthesis Effluent

The effluent which is the subject of this example is characterized by a high nonbiodegradable organic pollution. After treatment by wet-route oxidation, the effluent is characterized as follows:

pH: 10.3
TOC: 1540 mg/l
COD: 6600 mg/l
TKN: 2420 mg/l
N-$NH_4^+$: 1540 mg/l
PaIK: 370° F.
MaIK: 660° F.

The effluent is ozonized under the same conditions of contact time and of continuous injection of the ozone-containing gas into a bubble contactor, by:
a) ozonization with addition of hydrogen peroxide at a dose of 0.5 g/g of ozone at a pH adjusted to 7.5
b) ozonization in the presence of 7 g/l of cobalt in the form of a Co/SiO$_2$ heterogeneous catalyst in suspension The results obtained are given in Table 5 below:

TABLE 5

| Dose of ozone | | Oxidant system | $\Delta$TOC % | $\Delta$COD % | $\Delta$NTK % | $\Delta$N—$NH_4^+$ % |
|---|---|---|---|---|---|---|
| g $O_3$/ g TOC | g $O_3$/ g COD | | | | | |
| 8.4 | 2 | $O_3$ + $H_2O_2$ | 16 | 9 | 6 | 3 |
| 8.4 | 2 | $O_3$ + Co/SiO$_2$ | 52 | 53 | 83 | 89 |

The use of the catalyst relative to the addition of hydrogen peroxide results in a large increase in the degrees of reduction of the TOC, the COD, the TKN and the ammoniacal nitrogen for a constant dose of ozone. The ozone/catalyst oxidant couple brings about a simultaneous mineralization of the organic nitrogen and carbon without suffering the inhibition demonstrated for the ozone/hydrogen peroxide system which is associated with the high alkalinity of the effluent.

Needless to say, however, the present invention is not limited to the implementation examples described here, but instead encompasses all the variants which fall within the context of the claims hereinbelow.

What is claimed is:

1. A process of catalytic ozonization with molecular ozone or with a gas containing ozone, for the purification of polluted waters, comprising contacting the ozone or the gas containing ozone with a cobalt catalyst disposed on a support in contact with the polluted waters, wherein the support has a pore volume of from 0.1 ml/g to 1.3 ml/g.

2. The process as claimed in claim 1, wherein said support material is an oxide comprising an element selected from the group consisting of silicon tin, aluminum, zinc, copper, nickel, iron, manganese, chromium, molybdenum, vanadium, titanium, zirconium, cerium, magnesium, calcium, strontium, barium and mixtures thereof.

3. The process as claimed in claim 1, wherein the support used has a specific surface of from 10 m$^2$/g to 700 m$^2$/g.

4. The process as claimed in claim 1, wherein the cobalt disposed on the support represents from 0.1% to 20% by weight of the total weight of said supported catalyst.

5. The process as claimed in claim 1, wherein the supported cobalt catalyst contains one or more elements selected from the group consisting of Group 4A, Group 5A and the transition metals which can promote the activity of the cobalt catalyst by a synergistic effect.

6. The process as claimed in claim 5, wherein the one or more elements is selected from the group consisting of bismuth, copper, manganese, chromium, molybdenum and vanadium.

7. The process as claimed in claim 1, wherein said supported cobalt catalyst is used in a monolithic structure selected from the group consisting of packing for columns, and tubular or flat membranes.

8. The process as claimed in claim 1, wherein said contacting the supported cobalt catalyst and the polluted waters is conducted at a temperature of less than or equal to 100° C. and at a pressure of less than or equal to $5 \times 10^5$ Pa.

9. A process for the purification of polluted waters comprising providing water containing organics; and contacting the water containing organics with a catalyst containing cobalt in the presence of ozone, such that a %ΔCOD, as measured by %ΔCOD of hexanol, is at least four times that of a %ΔCOD than if the water containing organics is contacted with ozone in the absence of the catalyst under identical test conditions.

10. The process of claim 9, wherein the %ΔCOD for contacting the water with the catalyst and ozone is of at least five times that of the %ΔCOD than if the water containing organics is contacted with ozone in the absence of the catalyst under identical test conditions.

11. The process of claim 9, wherein contacting the water containing organics with a catalyst and ozone provides a %ΔCOD, as measured by %ΔCOD of mercaptoethanol, of at least 1.5 times that of a %ΔCOD than if the water containing organics is contacted with ozone in the absence of a catalyst under identical test conditions.

12. The process of claim 9, wherein the catalyst containing cobalt is a heterogeneous catalyst deposited on a support material.

13. The process of claim 12, wherein the support material comprises a metal oxide, the metal selected from the group consisting of silicon, tin, aluminum, zinc, copper, nickel, iron, manganese, chromium, molybdenum, vanadium, titanium, zirconium, cerium, magnesium, calcium, strontium, barium and mixtures thereof.

* * * * *